UNITED STATES PATENT OFFICE.

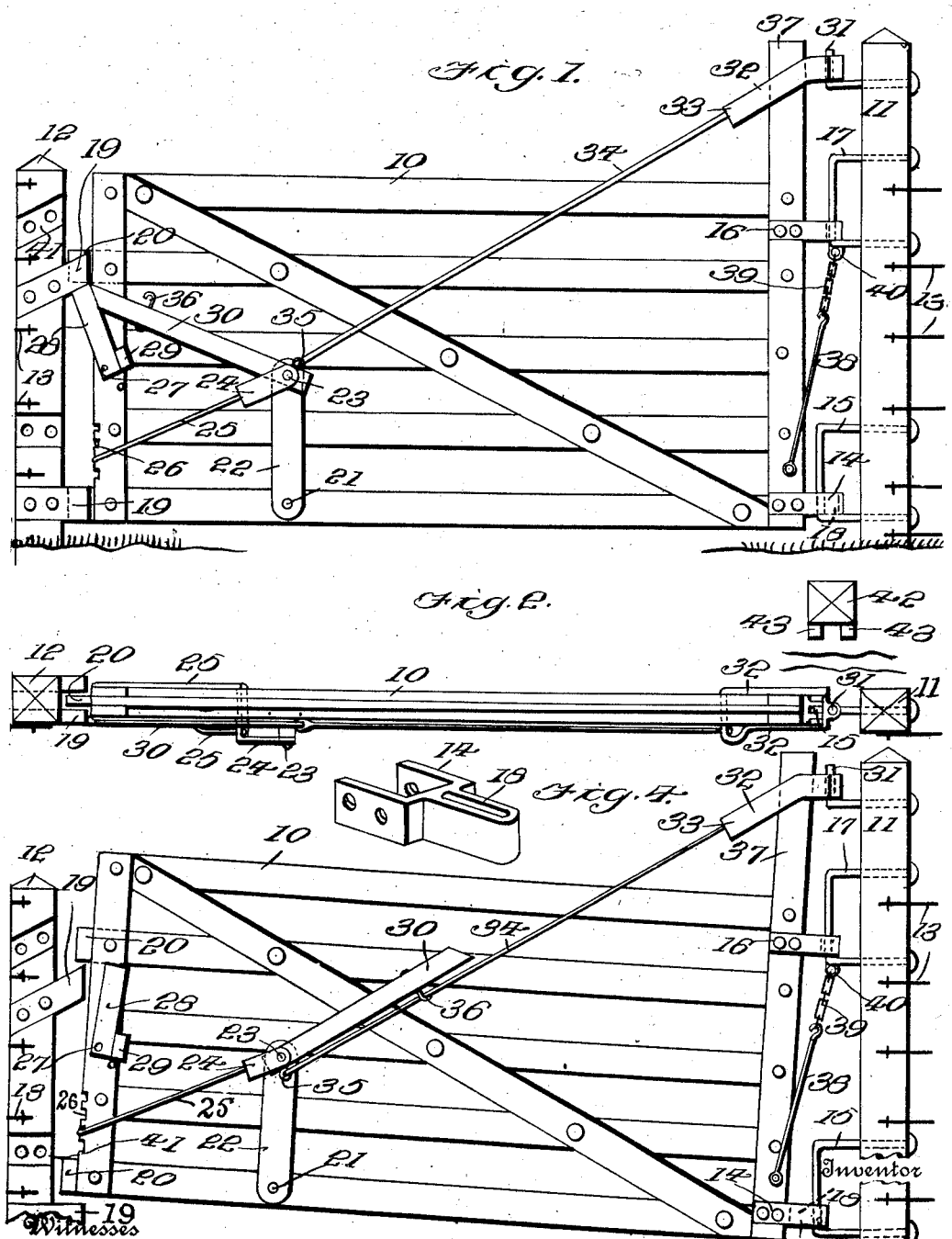

WILLIAM T. WYCKOFF, OF LAMONT, OKLAHOMA.

GATE-OPERATING DEVICE.

1,003,571. Specification of Letters Patent. Patented Sept. 19, 1911.

Application filed October 24, 1910. Serial No. 588,817.

*To all whom it may concern:*

Be it known that I, WILLIAM T. WYCKOFF, citizen of the United States, residing at Lamont, in the county of Grant and State of Oklahoma, have invented certain new and useful Improvements in Gate-Operating Devices, of which the following is a specification.

This invention relates to gate operating devices and has for one of its objects to simplify and improve the construction and increase the efficiency and utility of devices of this character.

Another object of the invention is to provide a simply constructed device whereby a gate may be placed in position to be readily opened and locked in open position by the same mechanism which is employed in opening the gate.

Another object of the invention is to provide a device whereby a gate may be placed in position to automatically open by gravity, and then locked in open position.

Another object of the invention is to provide a device whereby a gate may be placed in position to automatically open by gravity, and with means operating to adjust the gate at any desired height without interference with the releasing or locking means.

With these and other objects in view the invention consists in certain novel features of construction as hereinafter shown and described and then specifically pointed out in the claims; and, in the drawings illustrative of the preferred embodiment of the invention, Figure 1 is a side elevation of the improved apparatus showing the gate in closed position; Fig. 2 is a plan view of the same; Fig. 3 is a view similar to Fig. 1, showing the gate in its elevated position ready to be opened; Fig. 4 is an enlarged perspective view illustrating the construction of the lower hinge.

Corresponding and like parts are referred to in the following description and indicated in all the views of the drawings by the same reference characters.

The improved device is designed more particularly for use with the larger class of farm gates, and may be applied to gates of various sizes and construction, but for the purpose of illustration is shown applied to a gate represented conventionally at 10. The usual hinge post 11 and latch post 12 are employed, with the hinge post of greater length than the latch post as shown. The fence structure is represented conventionally at 13 and leading from the posts 11—12. The gate is hingedly united at its lower side at 14 by an elongated pintle 15 attached to the post 11, and at its upper side is likewise hingedly united at 16 by an elongated pintle 17 attached to the post 11. The hinge member 14 is slotted longitudinally, as shown at 18, so that the gate has a certain movement longitudinally upon the pintle 15, the object to be hereafter explained. Connected to the latch post 12 are spaced stops 19, between which the extended ends 20 of two of the gate rails rest when the gate is in closed or lowered position as shown in Figs. 1 and 2. When the gate is thus in closed position it is effectually maintained from movement in either direction, but by elevating the free end of the gate, which is possible by reason of the slot 18 of the hinge member 14, the gate will be released from engagement with the stops, and free to swing in either direction, as hereafter more fully explained.

Swingingly connected at 21 to the gate 10 and spaced from its free end is a vertical support 22, and pivoted at 23 to this support is a clevis 24, and leading from the clevis is a loop like device 25 which passes around the gate at its free end. The gate is provided with a plurality of notches 26 into one of which the loop 25 engages, so that the member 22 may be adjusted upon its pivot 21, the object to be hereafter explained.

Pivoted at 27 to the gate at its free end is a catch 28 which engages when in outer position beneath one of the stops 19 and thus locks the gate from upward movement. By this arrangement the gate is firmly held from displacement by hogs or other animals. The catch member 28 is provided with a weight 29 which operates to automatically release the catch.

Pivoted to the member 22, preferably by the same pivot 23 by which the clevis is connected thereto, is a lever 30 with its free end inclined and bearing when in one position against the catch and holding the same in engagement with the stop 19 and against the resistance of the weight 29.

Hinged at 31 to the hinge post 11, preferably near its upper end and thus spaced above the top of the gate, is a loop 32, the lower end of the loop being connected at 33 to a rod 34 and the rod in turn connected at 35 to the shorter end of the lever 30.

Connected to the lever 30 is a hook 36 to enable the lever to be coupled to the rod 34 when in its reversed position, as shown in Fig. 3, and thus maintain the gate in elevated position. The end member of the gate 10 next to the hinge post is extended above the body of the gate through the loop 32, as shown at 37, and remains constantly within the loop.

The elongated pintles 15—17 provide for the elevation of the gate to any position within the length of the pintles, so that the gate may be elevated in the winter time to pass over snow or ice, the extended portion 37 of the gate operating loosely through the loop and not affected by this upward adjustment of the gate.

Mounted to swing upon the gate 10 is a rod 38 having a section of chain 39 coupling the rod at 40 to the upper hinge pintle 17. By this simple means when the gate is to be elevated, as above noted, the chain is disconnected from the hook on the rod 38 and the gate elevated and the chain recoupled at a new point, and thus operate to hold the gate in its elevated position. When the gate is thus elevated it will be necessary to relocate the stops 19, and this can readily be done by providing an extra gain or recess 41 in the post 12 into which the stops can be secured by bolts or other fastening means.

With a device thus constructed when the lever 30 is in its lower position the gate is maintained in closed position as shown in Figs. 1 and 2. When the gate is to be opened the operator moves the lever 30 over into position substantially parallel with the rod 34, this action applying strain to the gate and elevating the free end of the same and releasing the gate from the stops 19. This disposes of the gate in position to be readily swung into open position, and when the required open position is reached the lever 30 is likewise released which permits the gate to drop into its former position. Any suitable means may be provided for holding the gate in its open position, such for instance as a post 42 provided with stops 43 similar to the stops 19. Thus the gate is held in closed or open position in substantially the same manner, and when the gate is to be closed the operator actuates the lever 30 in the same manner as when opening the gate. The gate may be arranged to open and close in either direction or open from one side only as may be preferred, without structural change of any kind, except to provide two of the stop posts 42 and their stops 43.

The improved device is simple in construction and can be applied to gates of various sizes and forms. By employing a plurality of the notches 26 the free end of the gate may be adjusted vertically to any required extent, so that when opened its free end will be caused to rise to a greater or lesser extent, and thus adapt the gate to the conditions of the ground adjacent to the gateway opening.

Having thus described my invention, what is claimed as new is:

1. In a gate operating device, a hinge post, a gate hingedly connected to said hinge post, a rod connected to swing at one end to said hinge post, a lever pivoted near one end to said gate and connected at one side of its pivot to said rod and coöperating therewith to elevate the free end of the gate when in one position, and means for detachably connecting said lever to said rod.

2. In a gate operating device, a hinge post and a latch post at opposite sides of a gateway opening, a gate hingedly connected to said hinge post, stops carried by said latch post and engaging the gate when in its lowered position, a rod connected to swing at one end to said hinge post, a lever pivoted to said gate and connected at one side of its pivot to said rod and coöperating therewith to elevate the free end of the gate and release it from the stops when disposed in one position, and means for detachably connecting said lever to said rod.

3. In a gate operating device, a hinge post, a gate hingedly connected to said hinge post, a rod connected to swing at one end to said hinge post, a lever pivoted near one end to said gate and connected at one side of its pivot to said rod and coöperating therewith to elevate the free end of the gate when in one position, a latch device operating to prevent upward displacement of the gate and engaged by said lever when in closed position, and means for detachably connecting said lever to said rod.

4. In a gate operating device, a hinge post, a gate hingedly connected to said hinge post, a rod connected to swing at one end to said hinge post, a lever pivoted near one end to said gate and connected at one side of its pivot to said rod and coöperating therewith to elevate the free end of the gate when in one position, adjusting means operating to control the relative positions of said rod and lever, and means for detachably connecting said lever to said rod.

5. In a gate operating device, a hinge post, a gate hingedly connected to said hinge post, a rod connected to swing at one end to hinge post, a lever pivoted near one end to said gate and connected at one side of its pivot to said rod and coöperating therewith to elevate the free end of the gate when in one position, adjusting means operating to control the relative positions of said rod and lever, a latch device operating to prevent upward displacement of said gate and engaged by said lever when in one position, and means for detachably connecting said lever to said rod.

6. In a gate operating device, a hinge post, a gate hingedly connected to said hinge post, a rod connected to swing at one end to said hinge post, a standard swinging upon said gate, a lever pivoted near one end to said standard and connected at one side of its pivot to said rod and coöperating therewith to elevate the gate when in one position, means for detachably connecting said lever to said rod, and adjusting means operating to control the positions of said rod and lever relative to the gate.

7. In a gate operating device, a hinge post and a latch post at opposite sides of a gateway opening, a gate, hinges swingingly connecting said gate to the hinge post, one of said hinges including a slotted member operating to permit the movement of the gate toward and away from the hinge post, stops carried by said latch post and engaging the gate when in its lowered position, a rod connected to swing at one end to said hinge post, a lever pivoted to said gate and connected at one side of its pivot to said rod and coöperating therewith to elevate the free end of the gate and free it from the stops when in one position, and means for detachably connecting said lever to said rod.

8. In a gate operating device, a hinge post, a gate hingedly connected to said hinge post with the end member adjacent to the hinge post extended upwardly, a loop connected to swing at one end to said hinge post and through which the extended portion of the gate is slidably disposed, a rod connected to swing at one end to said loop, a lever pivoted near one end to said gate and connected at one side of its pivot to said rod and coöperating therewith to elevate the free end of the gate when in one position, and means for detachably connecting said lever to said rod.

9. In a gate operating device, a hinge post, a gate hingedly connected to said hinge post, a loop connected to swing at one end to said hinge post and through which the gate is slidably disposed, a rod connected to swing at one end to said loop, a lever pivoted near one end to said gate and connected at one side of its pivot to said rod and coöperating therewith to elevate the free end of the gate when in one position, and means for detachably connecting said lever to said rod.

In testimony whereof, I affix my signature in presence of two witnesses.

WILLIAM T. WYCKOFF. [L. S.]

Witnesses:
E. G. PALMER,
C. A. BLASDEL.

---

Copies of this patent may be obtained for five cents each, by addressing the "Commissioner of Patents, Washington, D. C."